United States Patent Office 3,116,786
Patented Jan. 7, 1964

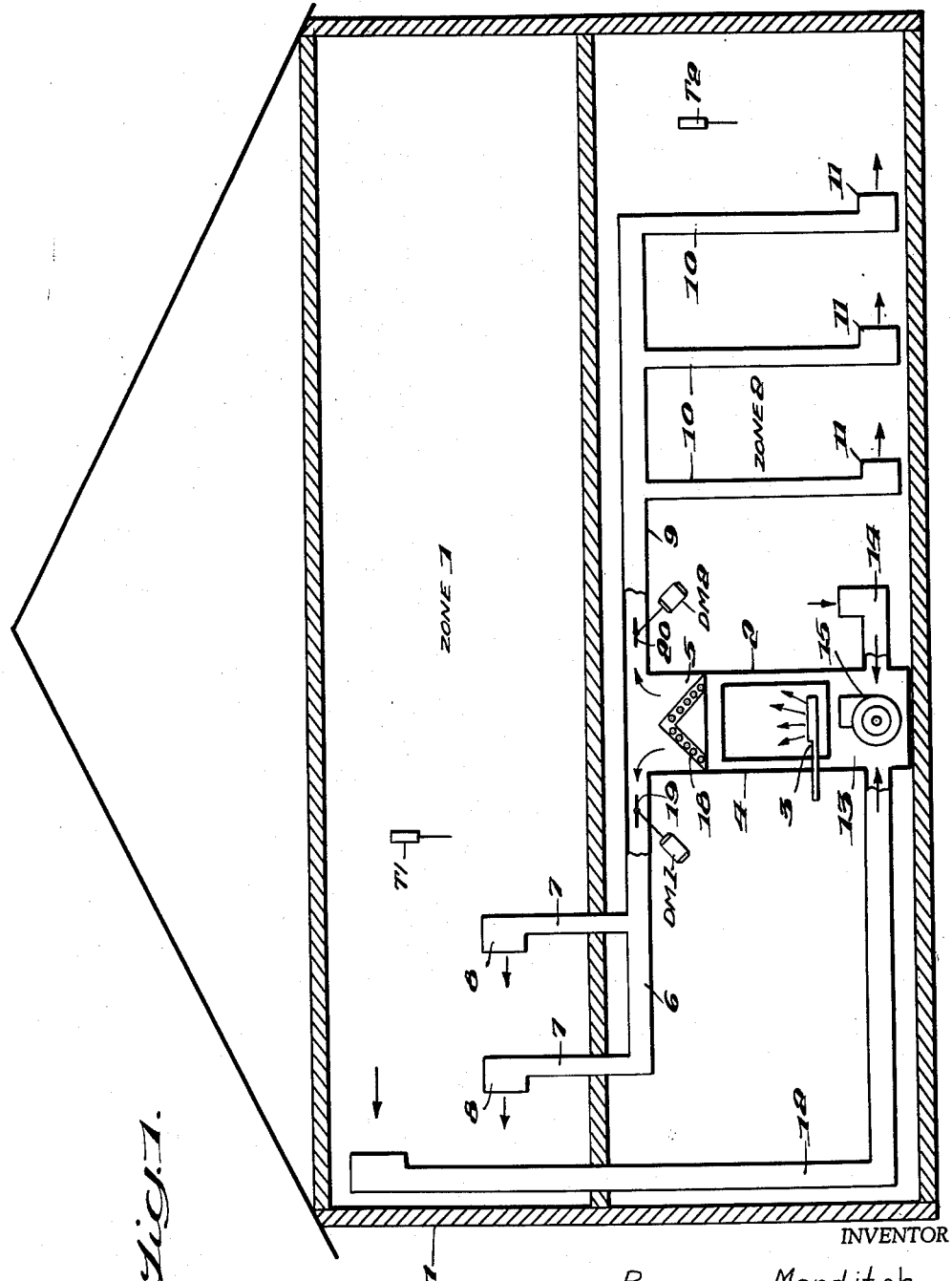

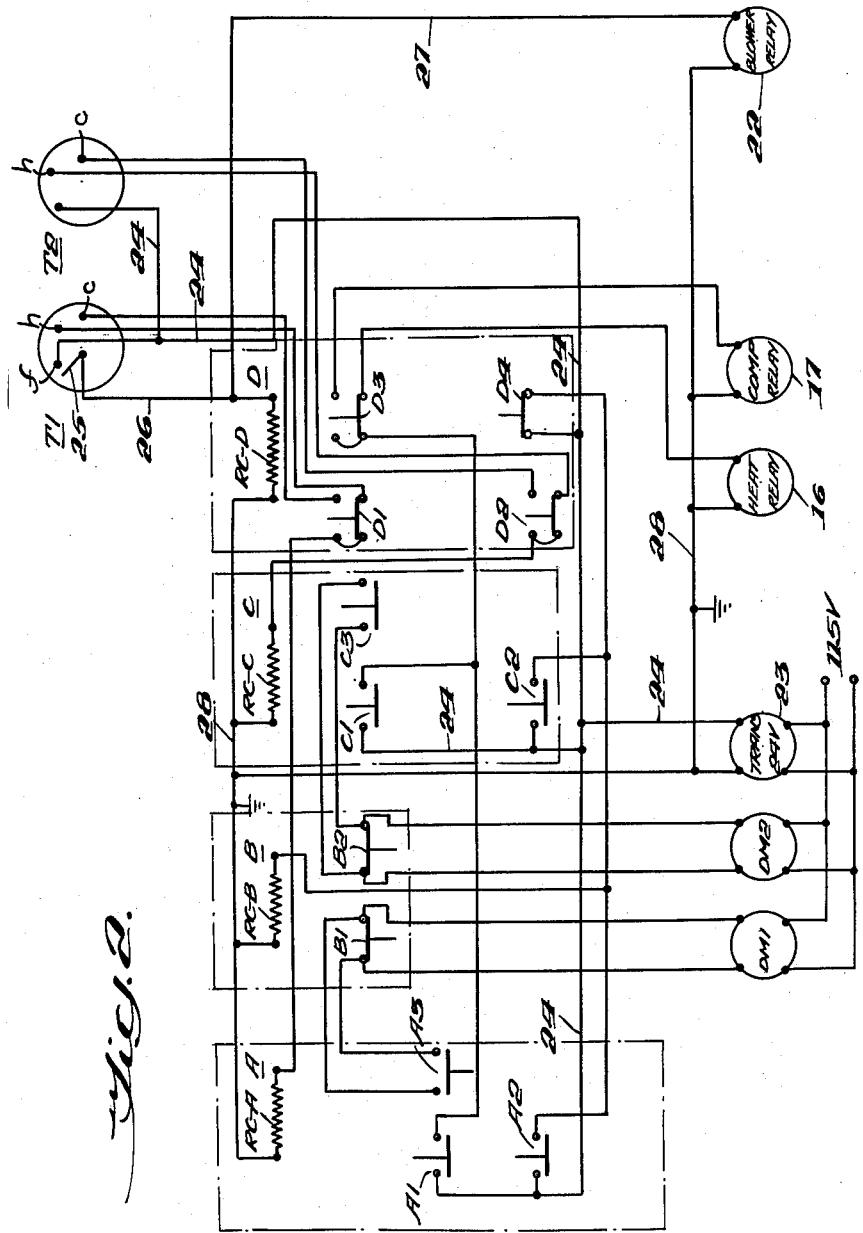

3,116,786
PLURAL ZONE HEATING AND COOLING SYSTEM
Barney Menditch, Silver Spring, Md., assignor to General Heating & Cooling, Inc., Washington, D.C., a corporation of Maryland
Filed Sept. 18, 1962, Ser. No. 224,381
7 Claims. (Cl. 165—22)

The present invention relates to heat and cooling systems for residential and other types of buildings wherein the interior space to be heated in winter and cooled in summer is divided off into a plurality of zones in order to establish a selective and more uniform heating and cooling characteristic for the various zones.

More particularly, the heating and cooling system to which the invention relates is of the forced air circulation type comprising a single enclosure containing a heating unit, a cooling unit and a blower for circulating the heated air in winter, and the cooled air in summer, through a ductwork system to the two or more zones which may be involved. Each zone is provided with a combination heating and cooling thermostat for control purposes by which one may select both the winter and summer temperatures desired for the particular zone involved. These thermostats not only control the off-and-on operations of the heating and cooling units but they also control dampers in the ductwork leading to the respective zones. For operation in winter, as soon as the desired temperature in one particular zone has been satisfied, the damper in the ductwork leading to that zone will be moved from an open position towards its closed position to a point short of the fully closed position thus permitting a small amount of air to pass by the damper.

The present invention is directed to an improved arrangement for controlling the operation of the combined system during summer when the system is operating on its cooling cycle and the object of the invention is to maintain a full circulation of air to all zones even in a situation where the temperature selected for each zone has been satisfied. With prior systems, so far as is known, when one zone has been cooled down to the desired temperature, the air flow control damper to that zone has been shifted to a nearly closed position thus forcing a larger part of the air to other zones which may then be above the temperature desired for such zones. When these other zones have then been satisfied as regards cooling, their respective dampers also move to a nearly-closed position, and during periods when no zone is calling for cooling, all control dampers have been closed or nearly closed, thus resulting in a reduction in air circulation to all zones which is extremely undesirable from a viewpoint of personal comfort.

In accordance with the present invention, when the system is operating on its summer hook-up, and the blower for circulating air is operating at all times, the thermostat in each zone when calling for cooling will turn on the cooling unit and leave open its respective damper and simultaneously close down the dampers to other zones in which their thermostats are at such time satisfied. This, of course, increases the air flow to the zone which needs to be cooled and hence, decreases the time required to bring the temperature in that zone down to the selected level. If more than one zone calls for cooling, then the dampers to all such zones will, of course, remain open. When all zones have been satisfied, the cooling unit cuts off and such dampers as may have been closed down re-open thus allowing full circulation of air to all zones.

The foregoing as well as other objects and advantages inherent in the invention will become more apparent from the following description of one suitable embodiment of the invention for a two-zone system, and from the accompanying drawings. In these drawings:

FIG. 1 is a section through a home of the bi-level type having upper and lower heating and cooling zones, the upper and lower zones being separately controlled by means of thermostats placed in the zones; and FIG. 2 is a schematic wiring diagram of the improved combined heating and cooling system which results in automatic re-opening of both dampers to the two zones during a summer hook-up under conditions where both zones are satisfied as to cooling thus assuring full circulation of air to both zones even though the cooling unit is cut-off.

With reference now to the drawings and to FIG. 1 in particular, there is shown somewhat diagrammatically a combined heating and cooling system for a home in which the space within the home to be heated or cooled, as the case may be, is divided into a plurality of zones each of which it is desired to control separately by means of a thermostat. In the illustrated embodiment, the home 1 is seen to be divided into two zones on different levels. The upper level is designated zone 1 and the lower level is designated zone 2. The heat and cooling systems emanate from a basically conventional single unit 2 of the forced air circulation type which includes a burner unit 3 of the oil or gas fired type, which is surrounded by air flow passageways 4 upwardly through which the warmed air is delivered to an air distribution bonnet 5. A supply duct 6 leads from bonnet 5 to the upper level of the home, zone 1, and branch ducts 7 are tapped from the supply duct 6 and lead to various outlets 8 distributed throughout the zone 1 part of the home. These are shown only diagrammatically. In a similar manner, another supply duct 9 leads from bonnet 5 to the lower level, zone 2, and branch ducts 10 are tapped from supply duct 9 and lead to various outlets 11 distributed throughout zone 2. A common air return duct 12 extends from zone 1 back to an air return manifold 13, located in the unit 2 below burner unit 3, another common air return duct 14 extends from zone 2 back to air return manifold 13, and the air from manifold 13 is directed into the inlet of the air blower 15 which is driven by a relay-controlled electric motor in the customary manner, the motor not being shown. The air discharged from blower 15 is directed upwardly through the passageways 4 surrounding the burner unit 3 and is recirculated. Burner unit 3 is cut on and off conventionally by means of a heat relay 16 shown in FIG. 2.

For cooling the home, when the burner unit 3 is shut down, a cooling system is used. The cooling unit per se is conventional, being of the compressor-condenser-evaporator type, and the evaporator unit 18 is located in the bonnet 5. The electric motor driven compressor unit and the condenser unit being conventional have not been illustrated. The compressor unit is driven by an electric motor and operation of the compressor is controlled by a compressor relay 17 shown in FIG. 2. As is well known, when the compressor unit is started by energizing relay 17, the refrigerant is circulated through the coils of the evaporator unit 18 where it expands and extracts heat from the air circulating through it.

For control purposes, one thermostat T1 is placed in zone 1 and a second thermostat T2 is placed in zone 2. One of these thermostats, such as thermostat T1 serves also as a "master," as will be explained later in further detail.

In accordance with the invention, a motor-operated damper 19 is placed in the air supply duct 6 for zone 1 and another motor-operated damper 20 is placed in the air supply duct 9 for zone 2. These dampers are controlled in accordance with the principal objective of the invention, when the apparatus is used for cooling purposes, to maintain both dampers open when both thermostats T1 and T2 are satisfied, i.e. when the temperatures in both zone 1 and zone 2 have been lowered to the desired level set on the respective thermostats, so that full circulation of air is maintained throughout both zones.

The combined heating and cooling system is controlled by means of the thermostats T1 and T2 and a system of interrelated relays which are shown in the circuit diagram of FIG. 2.

With reference now to FIG. 2, the circuit diagram includes the two thermostats T1 and T2, a motor DM1 for operating damper 19 controlling flow of air to zone 1 and a second motor DM2 for operating damper 20 controlling flow of air to zone 2, these damper motors being connected to a separate source of power, such as the usual 115 volt supply system for the home and indicated by the terminals legended "115 v.," and being controlled by relays. Motors DM1 and DM2 can be of any suitable type such as the plunger type M828 sold by Minneapolis Honeywell Co. Also shown in FIG. 2 are the relays 16 and 17 for controlling operation of the burner unit of the heating system and compressor unit of the cooling system, a relay 22 for controlling operation of the electric motor which drives the air circulating blower 15, a step-down transformer 23 having its primary connected to the 115 v. power supply and a secondary output of 24 volts, and four other relays A, B, C and D.

Energization of the coil for relay A, denoted by RC-A is controlled from the heating or cooling contacts in thermostat T1 dependent upon the position of the contacts D1 of relay D. The three sets of contacts for relay A are designated A1, A2 and A3. Contacts A1 are "normally" open, i.e. the convention observed in the deenergized state of coil RC-A. When closed, these contacts A1 connect the conductor 24 from one side of the secondary of transformer 23 to either the heat control relay 16 of the coolant compressor relay 17, dependent upon the position of the set of contacts D3 of relay D. Contacts A2 are normally open. When these contacts close they complete a circuit for energizing the coil RC-B of relay B from the 24 volt output conductor 24 from the secondary of transformer 23. Contacts A3 are normally open and feed through the terminals of contacts B1 of relay B to control the re-opening of operation of damper motor DM1.

Energization of the coil for relay B, denoted by RC-B, is controlled from contacts A2 of relay A, contacts C2 of relay C or contacts D4 of relay D. The two sets of contacts of relay B are designated B1 and B2. Contacts B1 are normally closed and are associated with damper motor DM1 for re-opening the damper 19 to zone 1 during summer when the system is operating on its cooling cycle. Contacts B2 are also normally closed and are associated with damper motor DM2 for re-opening the damper 20 to zone 2 during summer, cooling operation.

Energization of the coil for relay C, denoted by RC-C is controlled from the heating or cooling contacts in thermostat T2 dependent upon the position of contacts D2 of relay D. The three sets of contacts of relay C are designated C1, C2 and C3. Contacts C1 are normally open and when closed complete a circuit from the secondary output conductor 24 of transformer 23 to the heat control relay 16 or the compressor control relay 17 dependent upon the connections through the alternative sets of contacts D3 of relay D through which the circuit selectively passes. Contacts C2 are normally open. When closed, a circuit is completed through these contacts from the secondary output conductor 24 to the energizing coil RC-B of relay B. Contacts C3 are normally open. When closed, the circuit through these contacts and the terminals of relay contacts B2 control damper motor DM2 for reopening of damper 20 to zone 2 during summer, cooling operation.

Energization of the coil for relay D, denoted by RC-D is controlled by selector switch 25 in the master thermostat T1. The four groups of contacts of relay D are designated D1, D2, D3 and D4. Contact group D1 consists of two sets of contacts. One set is normally closed and is associated with the circuit from the heating contacts of the master thermostat T1 to the energizing coil RC-A of relay A, thus effecting energization of coil RC-A from the transformer secondary output conductor 24 as these heating contacts in the thermostat close. The other set of contacts of contact group D1 is normally open. When closed upon energization of relay coil RC-D, these contacts which are associated with the circuit from the cooling contacts of thermostat T1 complete an energizing circuit from the transformer secondary output conductor 24 to the coil RC-A of relay A when the cooling contacts of this thermostat close.

Contact group D2 also consists of two sets of contacts. One set is normally closed and is associated with the circuit from the heating contacts of thermostat T2 to the energizing coil RC-C of relay C thus effecting energization of coil RC-C from the secondary conductor 24 as these thermostat contacts close. The other set of contacts of contact group D2 is normally open. When closed upon energization of relay coil RC-D, these contacts which are associated with the circuit from the cooling contacts of thermostat T2 complete an energizing circuit from the secondary output conductor 24 to the energizing coil RC-C of relay C when the cooling contacts of this thermostat T2 close.

Contact group D3 also consists of two sets of contacts. One set is normally closed and is connected in the circuit from contact set A1 of relay A or contact set C1 of relay C to the heat control relay 16. The other set of contacts is normally open and is connected in the circuit from contact set A1 of relay A or contact set C1 of relay C to the coolant compressor control relay 17.

Contact group D4 consists of a single set of normally closed contacts. When contacts D4 are closed the secondary output conductor 24 is connected through to the energizing coil RC-B of relay B, and this relay remains energized continuously when the system is operating on its heating cycle.

The two thermostats T1 and T2 are of conventional construction such as, for example, a type T87, with a type Q-405 sub-base manufactured by the Minneapolis Honeywell Co., and hence, have been illustrated only diagrammatically in the drawings. Thermostat T1 serves as the "master" and includes a manually operable switch 25 which is closed to contact point f in summer when the system operates on its cooling cycle but which remains open during winter when the system operates on its heating cycle. When switch 25 is manually closed, it will be seen from FIG. 2 that the blower relay 22 is continuously energized from the 24 volt transformer secondary output conductor 24 through leads 26 and 27 thus causing the blower 15 to operate continuously and to thus continuously recirculate air through the two zones 1 and 2. During operation in winter when switch 25 remains open at the master thermostat T1, the blower relay 22 will be energized intermittently in conjunction with operation of the heat relay 16 through other and conventional connections and components, not illustrated, which include a thermostatically controlled switch in the bonnet 5 so that the blower relay 22 becomes energized only when the air in bonnet 5 has been heated to a preselected cut-on temperature and is thereafter de-energized when the air in the bonnet has decreased to a preselected cut-off temperature lower than the cut-on temperature.

Each of the thermostats T1 and T2 includes two sets of thermostatically controlled contacts for use in summer and winter respectively, these contacts sets enabling one to select the temperature desired to be maintained in each of the two zones 1 and 2 during the summer and winter. The structural details of these contact sets and their thermostatic controls have not been included in the schematic diagram of FIG. 2 since they are conventional.

For purposes of the present invention, these contacts have been more simply indicated by the letters *h*, for heating, and *c* for cooling.

OPERATION

*Cooling cycle.*—For operation in summer, when it is desired to cool the air in zones 1 and 2 to the temperatures selected on their respective thermostats T1 and T2, switch 25 on thermostat T1 is closed thus effecting continuous energization of the blower relay 22 and hence, continuous operation of the air circulating blower 15. Also, it will be seen from the circuit diagram of FIG. 2 that relay coil RC–D of relay D will be continuously energized by way of conductor 24 which is connected to one terminal of this relay coil. The other terminal of this relay coil and the similar terminals of the other relay coils RC–A, RC–B and RC–C are connected to a "common" return conductor 28, shown grounded, to the other side of the secondary of transformer 23.

With relay coil RC–D continuously energized, the bridges for relay contact groups D1, D2 and D3 will be shifted from their lower to their upper contact positions and the contact bridge associated with contacts D4 will cause a circuit to be opened through these contacts.

Should the temperature in only zone 1 rise above the desired temperature as set on thermostat T1, contacts *c* in this thermostat will close thus establishing an energizing circuit from conductor 24 through the upper set of contacts of contact group D1 to relay coil RC–A of relay A thus causing contacts A1, A2 and A3 of this relay to close through their bridges. Closure of contacts A1 completes an energizing circuit from conductor 24 through the upper set of contacts of contact group D3 to compressor relay 17 thus turning on the compressor and causing the refrigerant to pass through evaporator coil 18. As contacts A2 close, a circuit is also completed from conductor 24 through these contacts to one side of relay coil RC–B of relay B causing its contacts B1, B2 to open. At the same time, as contacts A3 close, a circuit is completed through the terminals of relay contacts B1 to the damper motor DM1, even though these contacts B1 are themselves open, causing damper 19 to remain in an open position and effect a maximum flow of cooling air through the duct system 6 to zone 1 to be cooled. At this time, since the thermostat T2 in zone 2 is "satisfied," its cooling contacts *c* are open with the result that no current can flow to coil RC–C of relay C and all contacts of this relay remain open, whereby no activating circuit can be completed through to damper motor DM2 and the damper 20 controlled thereby moves to its pre-set closed position.

Should the temperature in only zone 2 rise above the desired temperature set on thermostat T2, contacts *c* of this thermostat will close thus establishing an energizing circuit from conductor 24 through the upper set of contacts of contact groups D2 to relay coil RC–C of relay C thus causing contacts C1, C2 and C3 of this relay to close. Closure of contacts C1 completes an energizing circuit from conductor 24 through the upper set of contacts of contact group D3 to compressor relay 17 thus turning on the compressor and causing refrigerant to pass through the evaporator coil 18. As contacts C2 close, a circuit is completed from conductor 24 through these contacts to one side of relay coil RC–B of relay B causing its contacts B1, B2 to open. At the same time, as contacts C3 close, an activating circuit is completed through the terminals of relay contacts B2 to damper motor DM2, even though these contacts B2 are themselves open, causing damper 20 to remain in an open position and effect a maximum flow of cooling air through duct system 9 to zone 2. At this time, since the thermostat T1 in zone 1 is "satisfied," its cooling contacts *c* are open, with the result that no current can flow to coil RC–A of relay A and all contacts of this relay remain open, whereby no activating circuit can be completed through to damper motor DM1 and the damper 19 controlled thereby moves to its pre-set closed position.

In a situation wherein thermostat T2 is "satisfied" with respect to cooling while thermostat T1 calls for cooling, the compressor of the cooling system will operate, damper 20 will move to its pre-set closed position and damper 19 will remain open thus forcing practically all of the cooled air flowing upward into the bonnet 5 through ductwork 6 to zone 1. In the complementary situation, wherein thermostat T1 is "satisfied" with respect to cooling and thermostat T2 calls for cooling, damper 19 will move to its pre-set closed position and damper 20 will remain open thus forcing practically all of the cooled air from bonnet 5 through ductwork 9 to zone 2.

In a situation where both thermostats T1 and T2 call for cooling, energizing circuits will be completed to the relay coils RC–A and RC–C causing the closure of all contacts of both relays A and C, in which event the compressor relay 17 will be energized and activating circuits will be completed through to both damper motors DM1 and DM2 causing both dampers 19, 20 to move to or remain in their full open position and deliver cooling air to both zones 1 and 2.

In a situation where both thermostats T1 and T2 are "satisfied," as to cooling in zones 1 and 2, no energizing circuits for the coils of relays A and C will be established through the cooling contacts *c* of the thermostats and hence, the contacts of both relays will remain open, and no activating circuits by way of the contacts of these two relays A and C to the damper motors DM1 and DM2 or to the compressor relay 17 can be established. However, in this particular situation, relay B also remains deenergized, in which event its contacts B1 and B2 remain closed and hence, establish activating circuits through to both of the damper motors DM1 and DM2 causing both dampers 19 and 20 to move to full open position and provide full air circulation through zones 1 and 2 even though the compressor element of the cooling system is not then running and the air passing upward through bonnet 5 is not being cooled from the evaporator coil 18.

*Heating cycle.*—For operation during winter when it is desired to heat the air in zones 1, 2 to the temperatures selected on their respective thermostats T1, T2, switch 25 on the master thermostat T1 is opened thus transferring control of blower relay 22 over to the heating system wherein operation of this relay is controlled automatically as a function of the air temperature in the bonnet 5. Also, it will be seen from FIG. 2 that when switch 25 is opened, the current from conductor 45 through thermostat T1 and this switch to relay coil RC–D is likewise interrupted and hence, the bridges for the groups of contacts D1, D2, D3 will remain in their lower positions. The bridge associated with contacts D4 will be in the down position and thus close the circuit between these contacts to effect continuous energization of relay coil RC–B. The bridge positions as shown in FIG. 2 represent the circuit connections existing when each relay coil is in its de-energized state.

Should the temperature in only zone 1 drop below the desired temperature set on thermostat T1, contacts *h* of this thermostat will close thus establishing an energizing circuit from conductor 24 through the lower set of contacts of contact group D1 to relay coil RC–A of relay A thus causing the contacts A1, A2 and A3 to close through their respective bridges. Closure of contacts A1 completes an energizing circuit from conductor 24 through the lower set of contacts of contact group D3 to the heat relay 16 thus turning on burner 3. At the same time, closure of contacts A3 completes a circuit through the terminals of relay contacts B1 to damper motor DM1, even though relay contacts B1 are themselves open, thus causing damper 19 to move to its open position and effect a maximum flow of heated air through duct system 6 to zone 1 as soon as the blower relay 22 is energized by its on-and-off thermostat control. At this time since thermostat T2 in zone 2 is "satisfied," its heating contacts *h* are open with the result that no current can flow to coil RC–C of relay C and all contacts of the relay remain open whereby no activating circuit can be completed through to damper motor DM2 and the damper 20 controlled thereby remains in its pre-set closed position.

Should the temperature in only zone 2 drop below the desired temperature set on thermostat T2, contacts *h* of this thermostat will close and establish an energizing circuit from conductor 24 through the lower set of contacts of contact group D2 to relay coil RC–C of relay C causing contacts C1, C2 and C3 to close. Closure of contacts C1 completes an energizing circuit from conductor 24 through the lower set of contacts of contact group D3 to heat relay 16 thus turning on burner 3. At the same time as contacts C3 close, an activating circuit is completed through the terminals of relay contacts B2 to damper motor DM2, even though these contacts B2 are themselves open, causing damper 20 to move to an open position and effect a maximum flow of heated air through the duct system 9 to zone 2 as soon as the blower relay 22 is energized by its on and off thermostat control. At this time, since the thermostat T1 in zone 1 is "satisfied" its heating contacts *h* are open, with the result that no current can flow to coil RC–A of relay A, and all contacts of this relay remain open, whereby no activating circuit can be completed through to damper motor DM1 and damper 19 controlled thereby remains in its pre-set closed position.

Thus, in a situation wherein thermostat T2 is "satisfied" with respect to heating while thermostat T1 calls for heat, the burner 3 of the heating system will operate, damper 20 will remain in its pre-set closed position and damper 19 will open thus forcing practically all of the heated air through ductwork 6 to zone 1. In the complementary situation wherein thermostat T1 is "satisfied" with respect to heating and thermostat T2 calls for heat, damper 19 will remain in its pre-set closed position and damper 20 will open thus forcing practically all of the heated air through ductwork 9 to zone 2.

In a situation wherein both thermostats T1 and T2 call for heat, energizing circuits will be completed to the relay coils RC–A and RC–C causing closure of all contacts of both relays A and C, in which event the heat relay 16 will be energized to turn on burner 3, and activating circuits will be completed through to both damper motors DM1 and DM2 causing both dampers 19, 20 to move to their full open position and deliver heated air to both zones 1 and 2.

In a situation where both thermostats T1 and T2 are "satisfied" as to heating in zones 1 and 2, no energizing circuits for the coils of relays A and C will be established through the heating contacts *h* of the thermostats and hence, the contacts of both relays will remain open, and no activating circuits by way of the contacts of these two relays A and C to the damper motors DM1 and DM2 or to the heat relay 16 can be established. Moreover, since relay coil RC–B is energized continuously when the system is operating on its heating cycle by virtue of the fact that relay coil RC–D remains de-energized continuously while on the heating cycle and a circuit for continuous energization of relay coil RC–B is established to that coil through the closed contacts D4 by way of conductor 24, the damper motors DM1 and DM2 cannot obtain any actuating pulse through the relay contacts B1 and B2 since these contacts thus remain continuously open while the system is operating on its heating cycle.

In conclusion, it will be evident that the invention provides for full air circulation in all zones to be cooled in a situation where none of the zones is calling for cooling. Moreover, the improved system permits use of a single evaporator coil in the bonnet of the housing containing the burner unit for multi-zone selective cooling as distinguished from other systems which utilize separate evaporator coils for the ductworks leading to the various zones to be cooled. Also, it will be understood that while the cooling system has been illustrated as being of the compressor-evaporator-condenser type, other systems of cooling may equally as well be employed such as a system of the absorption type which utilizes a gas flame for compressing the refrigerant. Various other modifications and arrangements of the specific embodiment illustrated may also be made without, however, departing from the spirit and scope of the invention as defined in the appended claims.

I claim:

1. In a system of the forced air re-circulation type for cooling first and second zones, the combination comprising first and second ductwork systems leading respectively to said first and second zones from the output of a continuously operating air blower means, a motorized damper unit in each of said ductwork systems for controlling air flow therethrough, intermittently operative air cooling means in heat exchange relation with the air forced through said first and second ductwork systems, a thermostat in each such zone for selecting the temperature desired to be maintained in each such zone, means responsive respectively to the operation of each such thermostat when calling for cooling to effect operation of said air cooling means and to effect actuation of the damper unit in the particular ductwork system appertaining to the other zone not requiring cooling to a preset closed position and to cause the damper unit appertaining to the zone calling for cooling to move to or remain in the open position, and means responsive when both of said thermostats are satisfied and said air cooling means is not then in operation for maintaining both of said damper units in open position thereby to maintain full circulation of air from said blower means through both of said zones.

2. In a system of the forced air re-circulation type for cooling first and second zones, the combination comprising first and second ductwork systems leading respectively to said first and second zones from the output of a continuously operating air blower means, a motorized damper unit in each such ductwork system for controlling air flow therethrough, an intermittently operative air cooling means in heat exchange relation with the air forced through said first and second ductwork systems, a thermostat in each such zone for selecting the temperature desired to be maintained in each such zone, relay means individual to and actuated by the respective thermostats whenever said thermostats call for cooling, means responsive to the actuation of either of said relay means for operating said air cooling means and actuating the damper unit in the particular ductwork system appertaining to the other zone not requiring cooling to a preset closed position and to cause the damper unit appertaining to the zone calling for cooling to move to or remain in an open position, and additional relay means responsive when both of said thermostats are satisfied and said air cooling means is not then in operation for maintaining both of said damper units in open position thereby to maintain full circulation of air from said blower means through both of said zones.

3. A forced air re-circulation system as defined in claim 2 for cooling first and second zones wherein said relay means controlled by said thermostats are energized when said thermostats call for cooling and include contacts which are closed as the relay means are energized, the circuits for operating said air cooling means and for actuating the appertaining damper unit being completed by closure of the contacts of said relays, and wherein said additional relay means includes contacts which are closed when said additional relay means are un-energized, a circuit being completed through the closed contacts of said additional relay means for actuating both of said damper units to open position, energization of said additional relay means being controlled through the contacts of said thermostat controlled relay means whereby said additional relay means is energized when either of said thermostat controlled relay means is energized but remains un-energized when both of said thermostat controlled relay means are un-energized.

4. In a system of the forced air re-circulation type for cooling first and second zones, the combination comprising a housing containing a continuously operating air blower unit and an intermittently operative cooling unit whereby air to be cooled is circulated by said blower unit in heat exchange relation with said cooling unit, first and second ductwork systems extending respectively from said housing for delivering cooled air to said first and second zones respectively, a motorized damper unit in each of said ductwork systems, a thermostat in each such zone by which to select the temperature desired to be maintained in each such zone, means responsive respectively to the operation of each such thermostat when calling for cooling to effect operation of said air cooling unit and actuation of the damper unit in the ductwork system appertaining to the other zone not requiring cooling to a preset closed position and to cause the damper unit appertaining to the zone calling for cooling to move to or remain in the open position, and means responsive when both of said thermostats are satisfied and said cooling unit is not then in operation for maintaining both of said damper units in open position thereby to maintain full circulation of air from said blower unit through both of said zones.

5. In a system of the forced air re-circulation type for cooling first and second zones to selected temperatures, the combination comprising a housing containing a continuously operative air blower unit and an intermittently operative air cooling unit whereby air to be cooled is circulated by said blower unit in heat exchange relation with said cooling unit, first and second ductwork systems extending respectively from said housing for delivering cooled air to said first and second zones respectively, a motorized damper unit in each of said ductwork systems, a thermostat in each such zone by which to select the temperature desired to be maintained in each such zone, relay means individual to and actuated by the respective thermostats, means responsive to the actuation of either of said relay means for operating said air cooling unit and actuating the damper unit appertaining to the other zone not requiring cooling to a preset closed position and to cause the damper unit appertaining to the zone calling for cooling to move to or remain in the open position, and additional relay means responsive when both of said thermostats are satisfied and said cooling unit is not then in operation for maintaining both of said damper units in open position thereby to maintain full circulation of air from said blower unit through both of said zones.

6. A forced air re-circulation system as defined in claim 5 for cooling first and second zones wherein said relay means controlled by said thermostats are energized when said thermostats call for cooling and include contacts which are closed as the relay means are energized, the circuits for operating said air cooling unit and for actuating the appertaining damper unit being completed by closure of the contacts of said relays and wherein said additional relay means includes contacts which are closed when said additional relay means are un-energized, a circuit being completed through the closed contacts of said additional relay means to said damper units for actuating said damper units to open position, energization of said additional relay means being controlled through the contacts of said thermostat controlled relay means whereby said additional relay means is energized when either of said thermostat controlled relay means is energized but remains un-energized when both of said thermostat controlled relay means are un-energized.

7. In a combined system of the forced air re-circulation type for heating or cooling first and second zones, the combination comprising first and second ductwork systems leading respectively to said first and second zones from the output of air blower means, a motorized damper unit in each such ductwork system for controlling air flow therethrough, intermittently operative air cooling means in heat exchange relation with the air to be cooled and forced through said first and second ductwork systems, intermittently operative air heating means in heat exchange relation with the air to be heated and forced through said first and second ductwork systems, a thermostat in each such zone for selecting the temperature desired to be maintained in each such zone, first relay means operated by a manual switching device associated with one of said thermostats for changing said system over from operation on a heating cycle utilizing said air heating means to operation on a cooling cycle utilizing said air cooling means, said air blower means being rendered continuously operative by said switching device when said system is operating on its cooling cycle, relay means individual to and actuated by the respective thermostats whenever said thermostats call for cooling or for heating, circuit means responsive to the actuation of either of said thermostat controlled relay means and which extend through contacts of said first relay means for operating said air heating means dependent upon the position of the contacts of said first relay means for actuating only the damper unit in the particular ductwork system appertaining to the zone then requiring heating from a preset closed position to an open position, and for operating said air cooling means dependent upon the position of the contacts of said first relay means for actuating the damper unit in the ductwork system appertaining to the zone not requiring cooling to a preset closed position and to cause the damper unit appertaining to the zone calling for cooling to move to or remain in the open position, and additional relay means responsive when said system is operating on its cooling cycle and when both of said thermostats are satisfied and said air cooling means is not then in operation for maintaining both of said damper units in open position thereby to maintain full circulation of air from said blower means through both of said zones.

References Cited in the file of this patent

UNITED STATES PATENTS

| | | |
|---|---|---|
| 2,038,579 | Lamb | Apr. 28, 1936 |
| 2,885,187 | Myck | May 5, 1959 |